United States Patent [19]

Profit

[11] Patent Number: 5,836,060
[45] Date of Patent: Nov. 17, 1998

[54] TRUCK STRAP FASTENER ADAPTED FOR EITHER HOOK OR FLAT IRON ATTACHMENT

[76] Inventor: Grant Profit, 113 Quigley Dr., Cochrane AB, Canada, T0L 0W4

[21] Appl. No.: 787,530

[22] Filed: Jan. 23, 1997

[51] Int. Cl.⁶ .................................................. A44B 13/00
[52] U.S. Cl. ................................... 24/698.2; 24/265 CD; 24/198; 24/68 CD; 24/199
[58] Field of Search .......... 24/68 CD, 265 CD, 24/265 H, 265 AL, 198–200, 600.9, 601.4, 318, 343, 369, 370, 373, 185, 698.1, 698.2

[56] References Cited

U.S. PATENT DOCUMENTS

| | | | |
|---|---|---|---|
| 564,255 | 7/1896 | Rappold | 24/689.2 |
| 740,813 | 10/1903 | Croom et al. | 24/199 X |
| 1,055,067 | 3/1913 | Molloy | 24/198 |
| 1,405,516 | 2/1922 | Humphreys . | |
| 1,718,291 | 6/1929 | Guenther | 24/199 |
| 2,189,574 | 2/1940 | Anderson | 24/198 |
| 2,224,773 | 12/1940 | Shaulson | 24/199 X |
| 2,285,714 | 6/1942 | Hirsh | 24/198 X |
| 2,529,453 | 11/1950 | Johnson et al. | 24/698.2 X |
| 3,050,806 | 8/1962 | Cohn | 24/698.2 |
| 3,162,919 | 12/1964 | She | 24/698.2 |
| 3,327,361 | 6/1967 | Mathison | 24/198 |
| 3,936,914 | 2/1976 | Mancini | 24/698.2 |
| 5,139,375 | 8/1992 | Franchuk | 410/105 |
| 5,388,938 | 2/1995 | Helton | 410/101 |
| 5,416,956 | 5/1995 | Rubin | 24/601.4 |
| 5,443,341 | 8/1995 | Hamilton | 24/58 CD X |
| 5,458,447 | 10/1995 | Clason | 410/100 |

FOREIGN PATENT DOCUMENTS

| | | | |
|---|---|---|---|
| 1170404 | 1/1959 | France | 24/698.2 |

Primary Examiner—Randolph A. Reese
Assistant Examiner—Robert J. Sandy
Attorney, Agent, or Firm—David S. Thompson

[57] ABSTRACT

A truck strap fastener is adapted to enable a strap to be attached to either a downwardly directed hook or to a flat iron carried by standoffs attached to a trailer's frame. Flatbed trailers typically provide either a flat iron bar or a downwardly directed hook as the point of attachment for load securing tie-down straps. A fastener is disclosed that is adapted to attach to either point of attachment, and also to the tie-down strap. The fastener provides a body carrying left and right prongs which jointly fasten in place about a flat iron. Alternatively, a hook opening in the body allows a hook to pass between the left and right prongs and through the hook opening in the body.

1 Claim, 3 Drawing Sheets

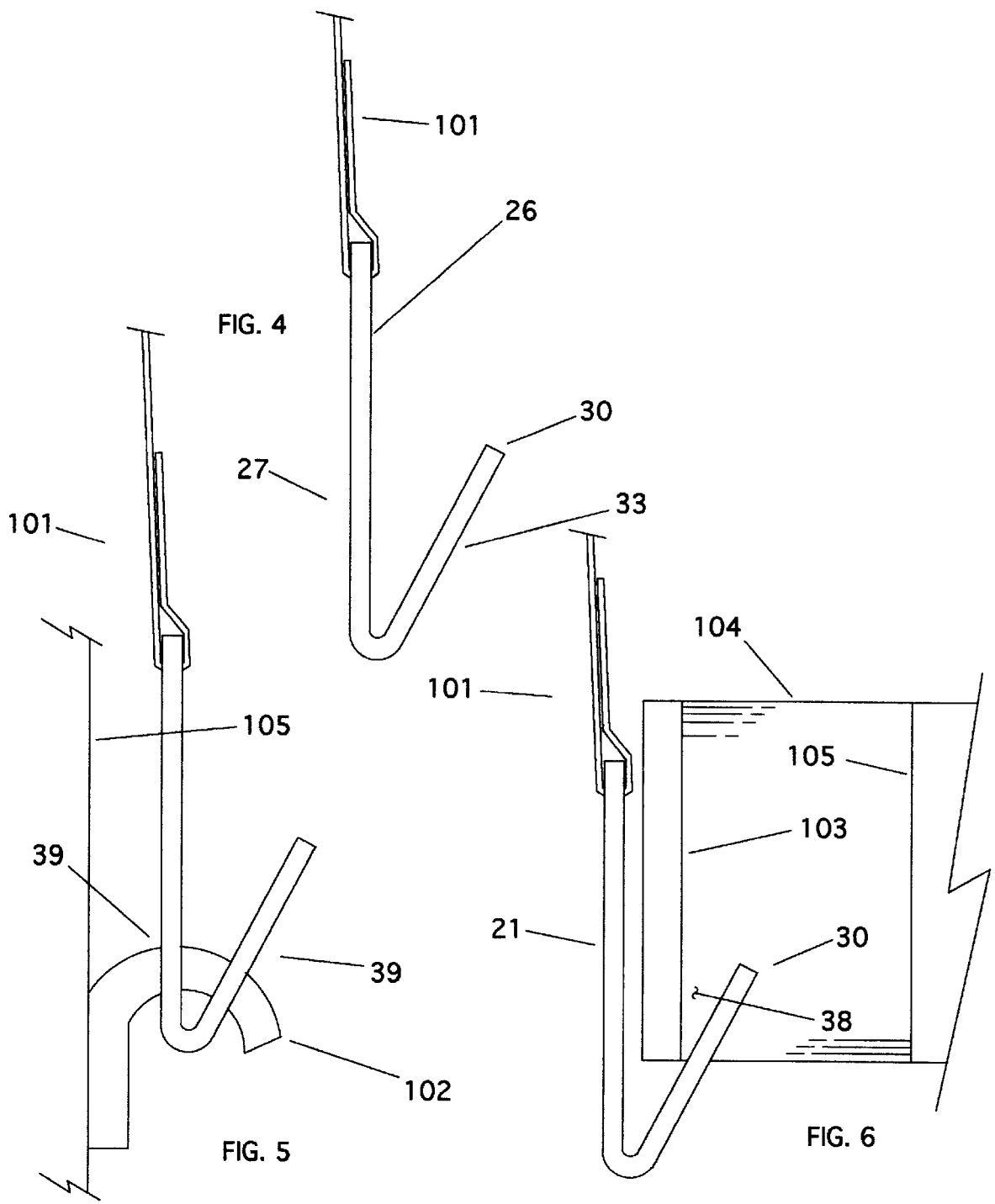

TRUCK STRAP FASTENER ADAPTED FOR EITHER HOOK OR FLAT IRON ATTACHMENT

CROSS-REFERENCES

There are no applications related to this application filed in this or any foreign country.

BACKGROUND

In the trucking industry, either of two types of fastener attachment points are commonly provided on flatbed trailers to secure the fasteners associated with straps used to secure the loads carried on such trailers. A first type of fastener is adapted to attach to a vertically oriented flat iron bar that is carried a spaced distance from standoffs by the trailer frame. Where such a flat iron is unavailable, a second type of fastener is adapted to attach to downwardly directed hooks carried at spaced intervals by the trailer's frame.

Since truck drivers may use one tractor to pull a number of different trailers, they often must invest in two sets of load-securing straps, one having each type of fastener. This may result in considerable expense, inconvenience, and the need to store the straps not being used.

For the foregoing reasons, there is a need for a fastener carried by a strap that can attach to either a flat iron type structure or an inverted hook structure.

SUMMARY

The present invention is directed to an apparatus that satisfies the above needs. A novel fastener for a load-securing strap is provided that allows connection to either an I-beam like flat iron or to an inverted hook carried by the frame of a flatbed trailer.

The fastener of the present invention provides some or all of the following structures.

(a) Strap attachment means for adjustably attaching a strap to the fastener. A body having upper and lower cross members 24, 25 and strap opening 26, allows the strap to be fed through the strap opening, folded against itself, and sewn securely in place.

(b) Flat iron connection means for attaching the fastener 20 to a flat iron type structure 103, including an flat iron receiving channel 38 between the body 21 and the pair of prongs 30.

(c) Hook connection means for attaching the fastener 20 to a downwardly directed hook 102, including a hook receiving passage 39 formed by a first hook opening 27 in the body 21 and a second hook opening 33 between the left and right prongs 31, 32.

More specifically, the fastener provides:

(a) A body 21, having a first hook opening 27 and a strap opening 26, the body having:
  (a) Generally parallel left and right side elements 22, 23 a spaced distance apart.
  (b) An upper cross member 24, connecting the left and right side elements 22, 23.
  (c) A lower cross member 25, parallel to the upper cross member 24, connecting the left and right side elements 22, 23.
  (d) A hook support rim 28 adjacent to the first hook opening.
(b) A curved base 29 having a hook support edge 36, the curved base attached to the body 21.

(c) A pair of prongs 30, extending from the curved base 29, the pair of prongs 30 and the hook support edge 36 defining a second hook opening 33, and the pair of prongs 30 together with the body 21 defining a flat iron receiving channel 38, the pair of prongs 30 including a left prong 31 and a right prong 32.

It is therefore a primary advantage of the present invention to provide a novel fastener that may be used to attach a load securing strap to either a flat iron bar carried by a flatbed trailer's frame or to an inverted hook structure.

Another advantage of the present invention is to provide a fastener that will allow the use of one set of securing straps on either type of flatbed trailer, and that will obviate the need for truckers to purchase two sets of straps, each set having one type of fastener.

DRAWINGS

These and other features, aspects, and advantages of the present invention will become better understood with regard to the following description, appended claims, and accompanying drawings where:

FIG. 4 is a side orthographic view of the fastener of FIG. 1 having a strap attached;

FIG. 5 is a side orthographic view of the fastener of FIG. 1 attached to a hook carried by a truck trailer; and FIG. 6 is a side orthographic view of the fastener of FIG. 1 attached to a flat iron separated by standoffs from the frame of a truck trailer.

DESCRIPTION

Figure 1:
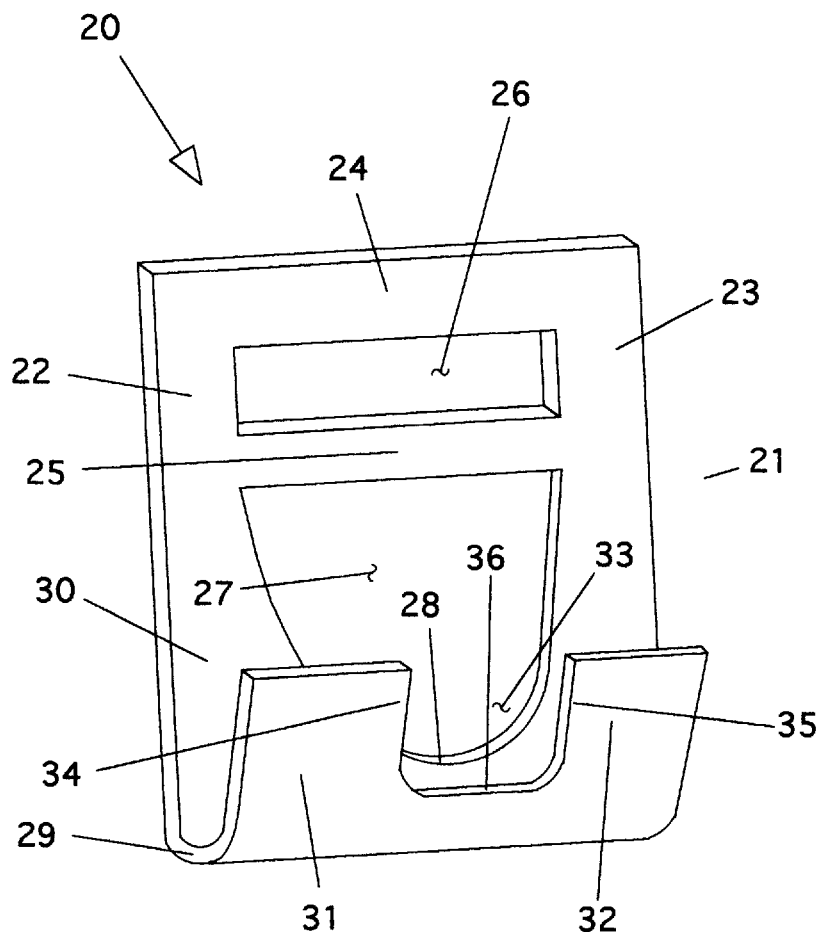
FIG. 1 is a front perspective view of a version of the invention of the truck strap fastener adapted for either hook or flat iron attachment.

An embodiment of the fastener 20 seen in FIG. 1, provides a body 21 having a curved base 29 from which extend left and right prongs 31, 32. The body provides upper and lower cross members 24, 25, which allow the connection of a load-securing strap 101. A flat iron receiving channel 38 is formed between the prongs 31, 32 and the body 21. A hook receiving passage 39 is formed by a first hook opening 27 in the body 21 and a second hook opening between the left and right prongs.

A fastener 20 for connecting a tie-down strap to a trailer, includes a body 21, having a first hook opening 27 and a strap opening 26. In a preferred embodiment, the body is approximately 3.75 inches tall and 3.75 inches wide and is made of heavy steel. The body also includes generally parallel left and right side elements 22, 23, which are positioned a spaced distance apart. An upper cross member 24 connects the upper ends of the left and right side elements 22, 23. A lower cross member 25, parallel to the upper cross member 24, also connects the left and right side elements 22, 23, defining the strap opening 26 between the upper and lower cross members. The body 21 also provides a hook support rim 28 adjacent to the first hook opening.

As seen in FIGS. 4–6, the upper and lower cross members 24, 25, together with the strap opening 26, allow for a load securing strap 101 to be passed through strap opening 26, folded back against itself, and sewn securely in place.

The curved base 29, attached to the body 21, provides a hook support edge 36. In the preferred embodiment the base 29 is curved. In alternative embodiments, the base may be squared off. However, the fastener is typically stronger and less costly to manufacture when the base is curved.

A pair of prongs 30 extends from the curved base 29. The pair of prongs having left and right inside edges 34, 35 and the hook support edge 36 define a second hook opening 33. A hook receiving passage 39 is formed by the combined first hook opening 27 in the body 21 and the second hook opening 33 between the prongs 31, 32. A hook 102 is seen in FIG. 5 passing through the hook receiving passage 39.

As seen in FIG. 6, the pair of prongs 30 together with the body 21 define a flat iron receiving channel 38.

Figure 2A:
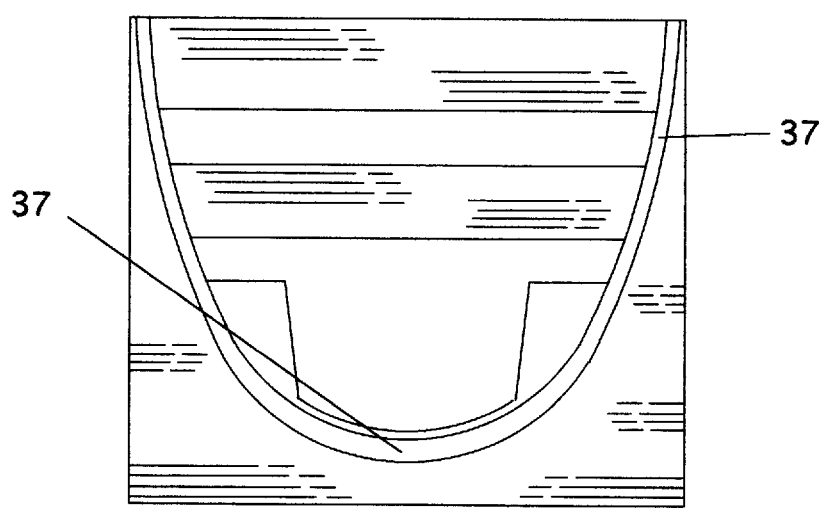
FIG. 2a is similar to the view of FIG. 2, having an optional reinforcing rim.
Figure 2:
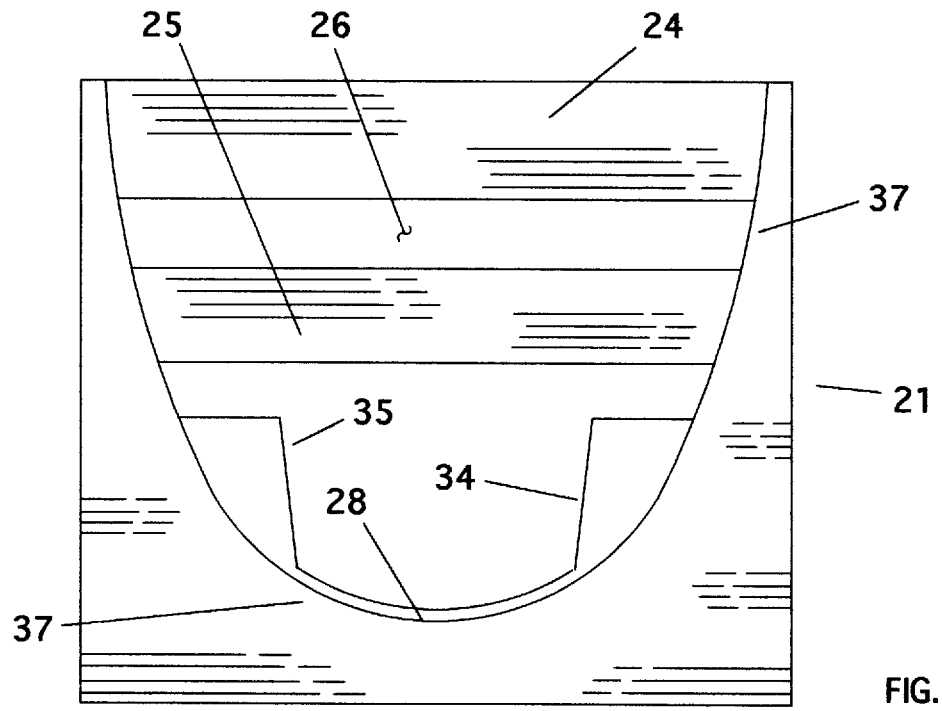
FIG. 2 is a rear orthographic view of the fastener of FIG. 1.
Figure 3:
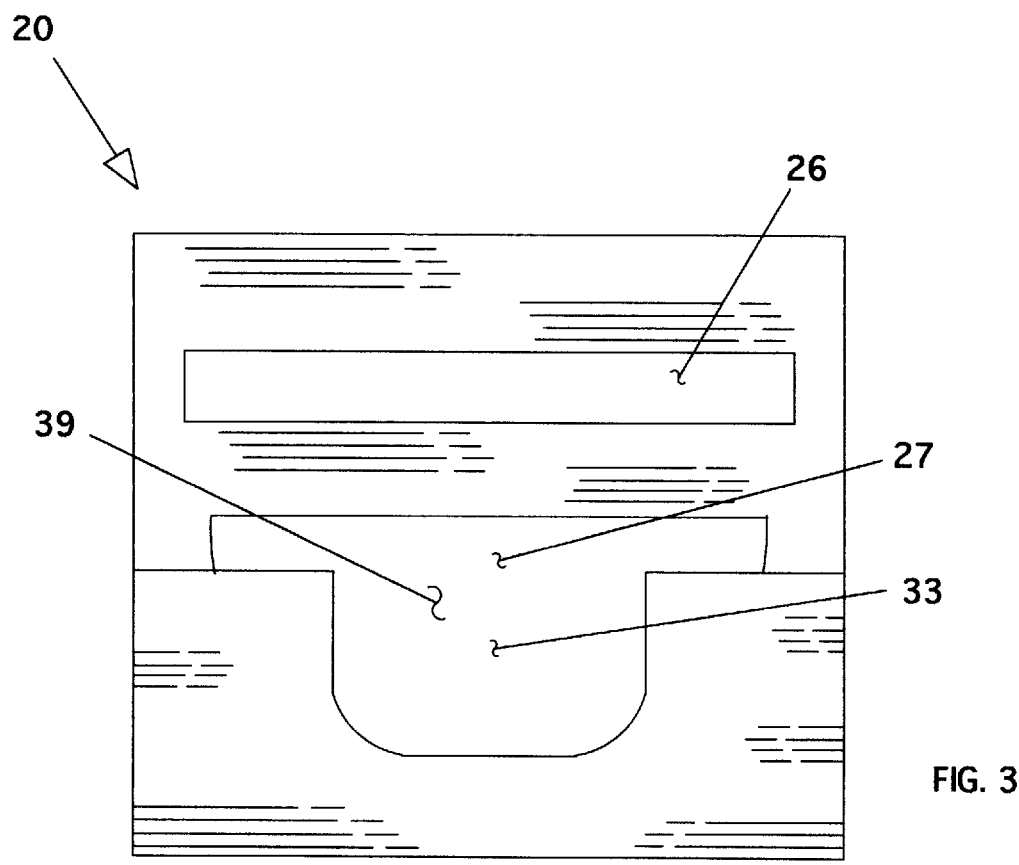
FIG. 3 is a front orthographic view of the fastener of FIG. 1.

As seen in FIG. 2a, an optional reinforcing rim 37 may be welded in place on the back side of the body 21, thereby reinforcing the hook support rim 28 of the first hook opening 27.

To use the fastener 20, the load-securing strap 101 is installed as seen in FIGS. 3–6. As seen in FIG. 5, a hook 102, carried by the trailer's frame 105, may be passed through the hook receiving passage 39 by putting the end of the hook through the first and second hook openings 27, 33. Alternatively, as seen in FIG. 6, the flat iron receiving channel 38 may be secured about the flat iron 103, thereby holding the load-securing strap in place. As seen in FIG. 6, a flat iron 103 is a vertically oriented iron beam or bar that is carried a spaced distance from the trailer frame 105 by perpendicularly oriented standoffs 104.

The previously described versions of the present invention have many advantages, including a primary advantage of providing a novel fastener that may be used to attach a load securing strap to either a flat iron carried by a flatbed trailer's frame or to an inverted hook structure.

Another advantage of the present invention is to provide a fastener that will allow the use of one set of securing straps on either type of flatbed trailer, and that will obviate the need for trucker drivers to purchase two sets of straps, each set having one type of fastener.

Although the present invention has been described in considerable detail and with reference to certain preferred versions, other versions are possible. For example, the exact dimensions and edge configurations are intended to illustrate the preferred embodiment only. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fastener for connecting a tie-down strap to a trailer, comprising:

(A) a body, defining a first hook opening and a strap opening, the body comprising:
(a) generally parallel left and right side elements a spaced distance apart, defining the first hook opening centrally located between the left and right side elements;
(b) an upper cross member, connecting the left and right side elements;
(c) a lower cross member, parallel to the upper cross member, connecting the left and right side elements, whereby the straps opening is a single elongate horizontally oriented strap opening defined within the body, and is bounded by the upper and lower cross members and by the left and right side elements and whereby the strap opening is adapted for attachment to the tie-down strap; and
(d) a hook support rim adjacent to the first hook opening;

B) a curved base, attached to the body, defining a hook support edge; and

C) a pair of prongs, extending from the curved base, the pair of prongs and the hook support edge defining a second hook opening, wherein the first and second hook openings are in alignment, together defining a hook receiving passage in a medial location within the fastener, and wherein the pair of prongs together with the body defining a flat iron receiving channel, the pair of prongs comprising generally straight left prong and right prongs.

* * * * *